United States Patent

Hammer et al.

[11] 4,002,485
[45] Jan. 11, 1977

[54] PROCESS FOR THE PRODUCTION OF THERMOPLASTIC SYNTHETIC MATERIALS OF CHEMICALLY MODIFIED PROTEIN AND PLASTIC SHAPING MATERIALS OF CHEMICALLY MODIFIED PROTEIN AND A CHEMICAL PLASTICIZER

[75] Inventors: Klaus-Dieter Hammer, Mainz; Wolfgang Klendauer, Wiesbaden; Max Bytzek, Naurod, all of Germany

[73] Assignee: Hoechst Aktiengesellschaft, Germany

[22] Filed: Oct. 3, 1975

[21] Appl. No.: 619,222

[30] Foreign Application Priority Data

Oct. 7, 1974 Germany .......................... 2447679

[52] U.S. Cl. .............................. 106/136; 106/147; 106/153; 106/154 Z; 106/161; 260/112 R; 260/117; 260/121; 260/123; 138/118.1

[51] Int. Cl.² ..................... C07G 7/00; C08L 89/00

[58] Field of Search .......... 260/561 N, 8, 112, 117, 260/121, 123; 264/202; 96/111; 8/127.6; 138/118.1; 106/124, 125, 135, 136, 138, 147–149, 154

Primary Examiner—Theodore Morris
Attorney, Agent, or Firm—James E. Bryan

[57] ABSTRACT

This invention relates to a process for the production of a thermoplastic synthetic material of chemically modified protein which comprises mixing an aqueous alkaline protein solution with an aqueous solution of a tetrafunctional, doubly unsaturated compound of the general formula

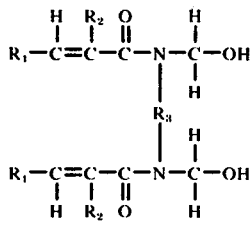

in which
$R_1$ and $R_2$ are hydrogen or an alkyl group with 1 to 6, preferably 1 to 3, carbon atoms, and
$R_3$ is the group $-(CH_2)_n-$, $n$ being an integer from 1 to 8, or the group

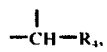

in which $R_4$ is an alkyl group with 1 to 18 carbon atoms,
subjecting the liquid mixture to a dwell time, causing a precipitating liquid to act upon the liquid, viscous mixture, freeing the formed precipitate from excess liquid, drying, mixing the precipitate with an at least bifunctional, saturated, organic compound, and subjecting the mixture to heat and pressure. The invention also relates to a plastic material of chemically modified protein.

15 Claims, No Drawings

PROCESS FOR THE PRODUCTION OF THERMOPLASTIC SYNTHETIC MATERIALS OF CHEMICALLY MODIFIED PROTEIN AND PLASTIC SHAPING MATERIALS OF CHEMICALLY MODIFIED PROTEIN AND A CHEMICAL PLASTICIZER

The present invention relates to a process for the production of thermoplastic synthetic materials of chemically modified protein. The present invention further relates to a process for the production of shaping materials composed of thermoplastic synthetic material of chemically modified protein and a chemical plasticizer.

The present invention further relates to thermoplastic synthetic materials of chemically modified protein as well as to shaping materials composed of thermoplastic synthetic material of chemically modified protein and a chemical plasticizer. The present invention also relates to the use of plastic material of chemically modified protein as well as to the use of shaping materials composed of plastic material of chemically modified protein and a chemical plasticizer, for the production of shaped articles, particularly of films and fibers, more particularly however of tubes.

The present invention also relates to films and fibers as well as, particularly, to tubes of plastic material of chemically modified protein and shaping materials of chemically modified protein and a chemical plasticizer.

The films or tubes produced from the plastic materials or shaping materials are particularly suitable for use as artificial sausage casings.

Artificial horn of casein and formaldehyde is produced according to a process which has been almost unchanged since 1904. According to that process, a paste is made of casein and water, plasticized under pressure at elevated temperatures and then exposed for a relatively long time to a 4 to 10 per cent by weight formaldehyde solution. The reaction product is then dried and heated, the casein molecules being linked by methylene bridges. Today, considerable quantities of artificial horn are processed into buttons, combs, trinkets, umbrella handles, piano keys, and similar articles. The known artificial horn has the disadvantage that it is relatively brittle and cannot be plasticized durably by the addition of secondary plasticizers. Tests to improve the property of the known artificial horn by replacing, in its production, formaldehyde by aminoplast precondensates do not lead to a marked improvement of the quality.

The object of the present invention is to provide a process according to which it is possible in a simple manner to produce thermoplastic synthetic materials of chemically modified protein which, compared to the known artificial horn, have the advantage that shaped articles produced therefrom have tensile strength and elongation values during their use which are superior to those of shaped articles of artificial horn and which process overcomes the disadvantages of the known processes, i.e. shaped articles of chemically modified protein which are produced according to those processes may have different strength and elongation values over their cross-sections due to non-uniform impregnation with cross-linking agent.

The present invention provides a process for the production of thermoplastic synthetic materials of chemically modified protein according to which protein is reacted with a chemical cross-linking agent and in which an aqueous alkaline protein solution is mixed with an aqueous solution of a tetrafunctional, doubly unsaturated, organic compound of the general formula

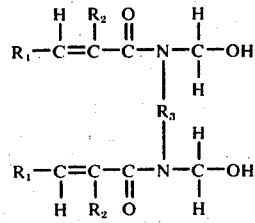

in which
$R_1$ and $R_2$ are hydrogen or an alkyl group with 1 to 6, preferably 1 to 3, carbon atoms, and
$R_3$ is the group $-(CH_2)_n-$, $n$ being an integer from 1 to 8, or the group

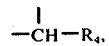

in which $R_4$ is an alkyl group with 1 to 18 carbon atoms, and stirred, the liquid mixture is subjected to a dwell time, precipitating liquid is caused to act upon the liquid, viscous mixture, the precipitate formed is freed from the excess of liquid, dried, mixed with a saturated, organic compound having at least two OH or at least two $NH_2$ groups or at least one OH and at least one $NH_2$ group in the molecule and the mixture is subjected to heat and pressure.

Organic, doubly unsaturated, tetrafunctional compounds of the general formula

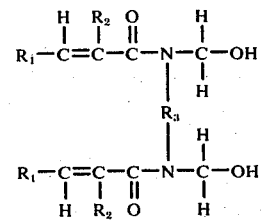

in which
$R_1$ and $R_2$ are hydrogen or an alkyl group with 1 to 6, preferably 1 to 3, carbon atoms, and
$R_3$ is the group $-(CH_2)_n-$, $n$ being an integer from 1 to 8, or the group

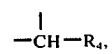

in which $R_4$ is an alkyl group with 1 to 18 carbon atoms,
are suitable.

Preferable tetrafunctional, doubly unsaturated, organic compounds according to the general formula above are those in which $R_1$ is hydrogen, $R_2$ is hydrogen or a methyl group, and $R_3$ is the group $-(CH_2)-$.

Preferable, therefore, is N-methylol-N,N'-methylene-bisacrylamide or N-methylol-N,N'-methylene-bismethacrylamide.

A mixture of the tetrafunctional, doubly unsaturated, organic compounds also may be used.

Suitable proteins are collagen, gelatin, peanut protein, zein, particularly however, casein. The proteins also may be used in admixture with one another.

In the following, a plastic intermediate product means a product which is obtained by the addition of protein molecules to the tetrafunctional, doubly unsaturated, organic compounds which have two reactive carbon double bonds and two reactive N-methylol groups in the molecule.

Organic, particularly aliphatic, saturated compounds having at least two reactive OH or at least two $NH_2$ groups or at least one OH and at least one $NH_2$ group are particularly advantageous:

Diols, such as glycol, propane diol, and butane diol, polyols, such as glycerol or pentaerithritol, polyglycols, such as polyethylene glycol of the general formula

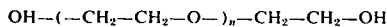

in which n is an integer from 1 to 20, preferably from 1 to 5, particularly preferably from 1 to 3 (diglycol, triglycol, polyethylene glycol 200),
of polypropylene glycol of the general formula

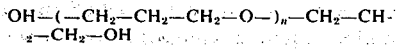

in which
n is an integer from 1 to 10, preferably from 1 to 5,
aliphatic diamines, the carbon chain of which has 1 to 6 carbon atoms, e.g. ethylene diamine as well as hexamethylene diamine,
aliphatic polyamines,
aliphatic hydroxyamines, e.g. 1-hydroxy-6-aminohexane,
urea, and
melamine.

The aliphatic, saturated, at least bifunctional compounds are contained in the corresponding solutions in quantities from 0.2 to 20 per cent by weight, preferably from 0.5 to 15 per cent by weight.

If the cross-linking agents, due to their molecular structure, have a plasticizing effect, internally plasticized plastics are obtained when they are used. In contradistinction to internally plasticized plastics, in the case of externally plasticized plastics, the chemical plasticizer is linked to the plastic material only by intermolecular forces and thus is extractable by means of suitable liquid means. The abovementioned cross-linking agents have an internal plasticizing effect, with the exception of urea and melamine.

The polyols suitable as internal plasticizers also may be used as external plasticizers.

In the process of the invention an aqueous alkaline protein solution is prepared, e.g. an aqueous alkaline casein solution, and mixed with an aqueous solution of a tetrafunctional, doubly unsaturated, organic compound having two reactive carbon double bonds and two reactive N-methylol groups in the molecule, e.g. N-methylol-N,N'-methylene-bisacrylamide or N-methylol-N,N'-methylene-bismethacrylamide. The liquid mixture is subjected to a dwell time. The plastic intermediate product is formed in the liquid reaction mixture during the dwell time, in the range from 4 to 6 hours, by the addition of the dissolved components. The reactive intermediate product is then precipitated from the liquid reaction solution, e.g. aqueous acid is added to the viscous reaction mixture.

The precipitated powder is freed from the excess of liquid, e.g. by filtering off, and dried, e.g. by the action of heat. The reactive plastic intermediate product is then mixed with the unsaturated, at least bifunctional substances, e.g. polyglycol. This may be performed in a conventional stirring device, for example.

The mixture is then subjected to the action of heat and pressure, e.g. to a temperature of 120° to 180° C during a period in the range from 5 to 60 minutes, and to a superatmospheric pressure in the range from 3 to 300 $kg/cm^2$, preferably from 5 to 80 $kg/cm^2$. Under these conditions, cross-linkage occurs between molecules of the plastic intermediate product and the molecules of the at least bifunctional, unsaturated, cross-linking agent, N-methylol groups of the molecule of the plastic intermediate product substantially reacting with reactive groups of the molecules of the at least bifunctional, unsaturated cross-linking agent.

The above-mentioned action of heat and pressure may be performed, for example, in a known extruder, a known plasticizing and kneading machine or in a calender.

The resulting thermoplastic synthetic material has a density in the range of 1.20 to 1.35 $g/cm^3$.

The material optionally can be repeatedly shaped by the action of heat and pressure.

Shaped articles of the plastic material can be processed easily, e.g. by sawing, drilling, cutting, polishing or the like.

The plastic material can be well colored with pigment dyes. It is resistant to water and organic solvents. Acids and alkalies hydrolyze it slowly. It is possible to add known chemical plasticizers to the plastic material, e.g. dibutyl adipate, adipic acid butylene glycol polyester, di-n-hexylphthalate, toluene sulfomethylamide, polyvinyl ether, dioctyl sebacate, dibenzyl sebacate, phthalic acid diethyl ester, di-n-butylphthalate, glycerol triacetate, hexane trioltriacetate, glycerol tripropionate, dicyclohexylphthalate, and other similarly acting known plasticizers which effect external plasticizing of the plastic material. These plasticizing agents are used in a quantity in the range of 3 to 40 per cent by weight, preferably 5 to 20 per cent by weight, calculated on the total weight of the plastic material. A mixture of plastic intermediate product, of at least bifunctional, unsaturated, organic cross-linking compound, and chemical plasticizer is used and this mixture is then subjected in the above-described manner to the action of heat and pressure. These plastificates are called plastic shaping material.

In the following, the process for the production of the plastic material is described in detail:

For this detailed description, the protein used is casein and the tetrafunctional, doubly unsaturated, organic compound with two reactive carbon double bonds and two reactive N-methylol groups is N-methylol-N,N'-methylene-bisacrylamide.

A casein solution is prepared by dissolving casein in water and then adding a corresponding quantity of 25 per cent by weight aqueous ammonia solution, the pH value of which solution is in the range between 8 and 14, preferably between 9 and 12.

The solution contains a portion of casein in the range between 3 and 20 per cent by weight, preferably in the range between 6 and 12 per cent by weight, calculated on the total weight of the solution. Furthermore, by dissolving a corresponding quantity of N-methylol-N,N'-methylene-bisacrylamide in water, a 1 to 30 per cent by weight, preferably 3 to 10 per cent by weight, aqueous solution of this substance is prepared.

The temperatures of both solutions are in the range between 2° and 80° C, preferably between 10° and 40° C, particularly preferably between 15° and 30° C.

The two solutions are then mixed with one another, with intense stirring, in such a quantitative ratio that the liquid mixture obtained thereby contains a portion in the range from 5 to 15 per cent by weight, preferably from 6 to 12 per cent by weight, of N-methylol-N,N'-methylene-bisacrylamide, calculated on the weight of the casein in the liquid mixture.

In the liquid mixture, the viscosity considerably increases spontaneously and a gelatinous mass is formed. The steep viscosity increase is completed after approximately 10 to 50 seconds. After a dwell time of the mass of approximately 4 to 6 hours at room temperature, its high structural viscosity is eliminated and the liquid then has a viscosity in the range between 80 and 250 falling-ball seconds. It is called the intermediate product solution.

The falling-ball viscosity is measured as follows:

A glass tube of a length of about 450 mm and an inside diameter of 25 mm has two marks at a distance of 150 mm from one another. One end of the tube is closed by means of a stopper. The solution to be measured is poured into the obliquely held tube until it is above the upper mark. The tube is then stored at 25° C until no air bubbles can be recognized in the filled-in solution. For measurement, a ball of a diameter of 2.5 mm and a weight of 64.5±0.9 mg is caused to fall into the upper opening of the vertical tube.

The falling time of the ball between the two marks is measured. The measure for the viscosity of the solution is the number of seconds which corresponds to the falling time of the ball between the two marks on the tube.

The plastic intermediate product can be precipitated as a crystalline powder from the viscous liquid aqueous plastic intermediate product solution in the form of an addition compound of protein and the unsaturated, organic, tetrafunctional compound of the stated general formula by the addition of aqueous acid to the aqueous plastic intermediate product solution. For this purpose, the aqueous plastic intermediate product solution is continuously poured, with intense stirring, into a sufficient quantity of diluted acid, e.g. aqueous hydrochloric acid, aqueous sulfuric acid or aqueous acetic acid, of a concentration in the range between 3 and 30 per cent by weight, preferably between 5 and 15 per cent by weight. The precipitate is filtered off, washed with water, and dried in the air or in a drying cabinet with warm air at 30° to 160° C.

The dry plastic intermediate product is finely pulverized and mixed with an organic saturated, at least bifunctional, cross-linking compound, e.g. polyethylene glycol 200 effecting internal plasticizing, by means of a known mixer, for example.

The quantitative ratio of the two components is so selected that the mixture contains cross-linking agent in the range of 5 to 20 per cent by weight, preferably 6 to 15 per cent by weight, calculated on the weight of the plastic intermediate product.

This mixture is then subjected for 5 to 60 mixtures to the action of heat in the range of 120° to 180° C and to a superatmospheric pressure in the range of 30 to 300 kg/cm$^2$; this may be performed in a known heatable pressure kneader, for example. The lumpy product produced is then granulated in known manner by means of a known mill suitable therefor. It is also possible to supply the mixture to the filling hopper of a known extruder and extrude it, under the above heat and pressure conditions, into a shaped article.

If the plastic material is extruded in the form of a web or a strand, this web or strand can be converted into a granulate by means of known crushing devices. The plastic granulate obtained then can be again processed at any later date into shaped articles of the desired shape by the action of heat and pressure, e.g. by means of extruders, calenders or injection moulding machines.

The action of heat and pressure upon the mixture of plastic intermediate product and organic, saturated, at least bifunctional cross-linking compound effects splitting-off of $H_2O$ between reactive N-methylol groups of the intermediate product and reactive groups of the organic, saturated, at least bifunctional compound.

Films or tubes produced from the plastic material are particularly suitable for use as wrappings for foodstuffs since they are biologically degradable. By the action of aqueous chymotrypsin solution (3 g/l of sodium phosphate solution; pH 7.4) tubes, for example, are degraded completely during 2 hours, whereas films of collagen are degraded under these circumstances only after 4 hours.

The process is not only substantially simpler in the performance thereof than are the known processes for the production of artificial horn, but it is also substantially less time-consuming and leads to products which have substantially uniform characteristics over their entire cross-section.

When for the production of the plastic material, organic, at least bifunctional cross-linking agents are used which, due to their molecular structure, do not have a plasticizing effect, shaped articles produced from this plastic material have a substantially smaller elongation than those produced with the use of cross-linking agents having an internal plasticizing effect.

The present invention also relates to a plastic material and to a plastic shaping material of chemically modified protein and of chemically modified protein and a chemical plasticizer, respectively, which can be obtained when an aqueous alkaline protein solution is mixed with an aqueous solution of an organic, unsaturated, bifunctional compound of the general formula

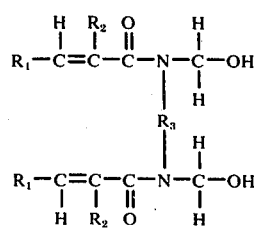

in which
$R_1$ and $R_2$ are hydrogen or an alkyl group with 1 to 6, preferably 1 to 3, carbon atoms, and $R_3$ is the group $-(CH_2)_n-$, $n$ being an integer from 1 to 8, or the group

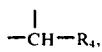

in which $R_4$ is an alkyl group with 1 to 18 carbon atoms, the liquid mixture is subjected to a dwell time, precipitating liquid is caused to act upon the liquid mixture, and an organic, saturated, compound with at least two OH or at least two $NH_2$ groups or at least one OH and at least one $NH_2$ group is caused to act upon the precipitated powder and, for the production of shaping materials, optionally additionally, chemical plasticizer is caused to act upon the plastic material, and the mixture is then exposed to heat and pressure.

Within the scope of the present invention, a material composed of the plastic material of the invention and of a chemical plasticizer linked thereto by intermolecular forces is termed a "shaping material". According to known processes for processing thermoplastic synthetic materials, it is possible to produce from these shaping materials filaments, tubes, profiles, films or other shaped articles by means of extruders, calenders or injection moulding machines.

The invention will be further illustrated by reference to the following specific examples:

EXAMPLE 1

100 g of casein, corresponding to 87.8 g of pure milk protein, (Rovita FN 4; Rovita GmbH, Aschau/Kraiburg, Germany) are uniformly stirred into 695 ml of water and swollen for 20 to 30 minutes. The casein is dissolved by the addition of 43.5 ml of concentrated $NH_4OH$ (25 per cent). The pH value of the solution is 10. After the solution has been stirred for several hours at room temperature, it is degassed in known manner and then mixed with 105 ml of a 4.3 per cent by weight (6 per cent by weight, calculated on the milk protein) aqueous N-methylol-N,N'-methylene-bisacrylamide solution.

Within 10 to 30 seconds, the reaction mixture becomes gelatinous, after approximately 4 hours at room temperature it has a viscosity of 140 falling-ball seconds. The reaction mixture is then slowly stirred into 800 to 1,000 ml of 10 per cent sulfuric acid. The precipitate formed is filtered off, washed several times with water until the filtrate has a neutral reaction; the powder is then dried in the air. The dried intermediate product is finely ground and uniformly mixed with 15 per cent by weight of polyethylene glycol 200, calculated on the weight of the intermediate product. In a mould, the mixture is moulded for 20 minutes by means of a press at a pressure of 50 kg/cm² and a temperature of 130° C; a body in the form of a plate is obtained thereby. The shaped article has a density of 1.28 g/cm³.

The plate is granulated by means of a granulating mill. The granulate is extruded by means of an extruder having an annular slot die to form a plastic tube.

EXAMPLE 2

The procedure is as in Example 1, but with the exception that the reactive plastic intermediate product is not mixed with polyglycol but with the same quantity of glycol and an additional quantity of 18 per cent by weight of triglycol, calculated on the total weight of the mixture. The mixture is moulded under the above conditions in a plate-shaped mould by means of a heated press to form a plate of plastic shaping material. The plate is then ground in a granulating mill to form a granulate. The granulate is extruded in an extruder having an annular slot die to form a tube. The extruded tube is composed of chemically modified protein and plasticizer.

EXAMPLE 3

The procedure is as in Example 1 but with the exception that, after the casein solution has been stirred for several hours at room temperature, this solution is degassed in known manner and then mixed with 106 ml of a 5 per cent by weight (6 per cent by weight, calculated on milk protein) aqueous N-methylol-N,N'-methylene-bismethacrylamide solution.

The reaction mixture is further treated as indicated in Example 1. As a variation of Example 1, the dried intermediate product (chemically modified casein) is finely ground and uniformly mixed with 4.5 g of polyethylene glycol 200. The mixture is filled into a suitable plate mould and exposed for 20 minutes at a temperature of 140° C to a pressure of 50 kg/cm². The resulting plate-shaped body has a density of 1.31 g/cm³.

The plate-shaped body is crushed in a granulating mill to form a granulate, and the granulate of shaping material is extruded by means of an extruder with an annular slot die into a tube.

In another test, an extruder with a slot die is charged with the above granulate and a film is extruded.

EXAMPLE 4

The procedure is as in Example 3 but with the exception that 4.8 g of polyethylene glycol 200 are uniformly mixed with the dried intermediate product (chemically modified casein) and further processing is the same as in Example 3. The resulting mixture then is composed of an internally plasticized plastic material based on chemically modified protein.

The granulate is extruded as in Example 3 by means of an extruder with an annular slot die or a slot die into a tube or a plastic film.

EXAMPLE 5

The procedure is the same as in Example 1 but with the exception that the dried intermediate product (chemically modified protein) is uniformly mixed with 4.8 g of polyethylene glycol 200, filled into a plate-shaped mould and heated for 20 minutes at 140° C by means of a press at a pressure of 50 kg/cm². The plate-shaped body is granulated as described above. The granulate is processed by means of an extruder with a slot die or an annular slot die into a film or a tube.

It will be obvious to those skilled in the art that many modifications may be made within the scope of the present invention without departing from the spirit thereof, and the invention includes all such modifications.

What is claimed is:

1. A process for the production of a thermoplastic synthetic material of chemically modified protein which comprises mixing an aqueous alkaline protein solution with an aqueous solution of a tetrafunctional, doubly unsaturated compound of the general formula

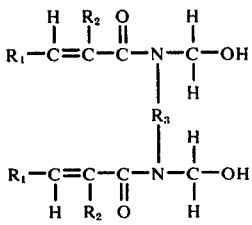

in which
R₁ and R₂ are hydrogen or an alkyl group with 1 to 6, preferably 1 to 3, carbon atoms, and
R₃ is the group —(CH₂)ₙ—, n being an integer from 1 to 8, or the group

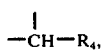

in which R₄ is an alkyl group with 1 to 18 carbon atoms,
subjecting the liquid mixture to a dwell time, causing a precipitating liquid to act upon the liquid, viscous mixture, freeing the formed precipitate from excess liquid, drying, mixing the precipitate with an at least bifunctional, saturated, organic compound, and subjecting the mixture to heat and pressure.

2. A process according to claim 1 in which the tetrafunctional, doubly unsaturated, organic compound is N-methylol-N,N'-methylene-bisacrylamide or N-methylol-N,N'-methylene-bismethacrylamide.

3. A process according to claim 1 in which the at least bifunctional, saturated, organic compound is triglycol or polyethylene glycol 200.

4. A process according to claim 1 in which the precipitating liquid is an aqueous acid.

5. A process for the production of a shaping material composed of a plastic material of chemically modified protein and a chemical plasticizer, which comprises mixing an aqueous alkaline protein solution with an aqueous solution of a tetrafunctional, doubly unsaturated, organic compound of the general formula

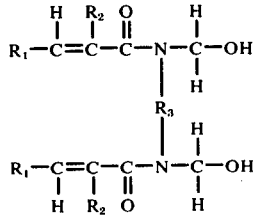

in which
R₁ and R₂ are hydrogen or an alkyl group with 1 to 6, preferably 1 to 3, carbon atoms, and
R₃ is the group —(CH₂)ₙ—, n being an integer from 1 to 8, or the group

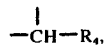

in which R₄ is an alkyl group with 1 to 18 carbon atoms,
subjecting the liquid mixture to a dwell time, causing a precipitating liquid to act upon the liquid mixture, freeing the formed precipitate from excess liquid, drying, and mixing the precipitate with an at least bifunctional, saturated, organic compound and additionally with a chemical plasticizer, and subjecting the mixture to heat and pressure.

6. A process according to claim 5 in which the tetrafunctional, doubly unsaturated, organic compound used is N-methylol-N,N'-methylene-bisacrylamide or N-methylol-N,N'-methylene-bismethacrylamide.

7. A process according to claim 5 in which the at least bifunctional saturated, chemical cross-linking compound used is triglycol or polyethylene glycol 200.

8. A process according to claim 1 in which the chemical plasticizer used is dibutyl adipate.

9. A process according to claim 1 in which the protein is casein.

10. A tube of a plastic material produced according to claim 1.

11. A tube of a material produced according to claim 5.

12. A plastic material of chemically modified protein obtained by mixing an aqueous alkaline protein solution with an aqueous solution of an organic, unsaturated, bifunctional compound of the general formula

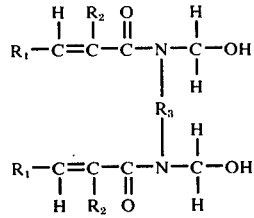

in which
R₁ and R₂ are hydrogen or an alkyl group with 1 to 6, preferably 1 to 3, carbon atoms, and
R₃ is the group —(CH₂)ₙ—, n being an integer from 1 to 8, or the group

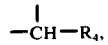

in which R₄ is an alkyl group with 1 to 18 carbon atoms,
subjecting the liquid mixture to a dwell time, causing a precipitating liquid to act upon the liquid mixture, freeing the precipitate from excess liquid, mixing the precipitate with an organic, saturated, chemical compound having at least two OH or at least two NH₂ groups or at least one OH and at least one NH₂ group, and subjecting the mixture to heat and pressure.

13. A plastic material of chemically modified protein obtained by mixing an aqueous alkaline protein solution with an aqueous solution of N-methylol-N,N'-methylene-bisacrylamide or N-methylol-N,N'-methylene-bismethacrylamide, subjecting the liquid mixture to a dwell time, causing a precipitating liquid to act upon the liquid mixture, freeing the precipitate from excess liquid, mixing the precipitate with an organic, saturated compound with at least two OH or at least two NH₂ groups or at least one OH and at least one NH₂ group, and subjecting the mixture to heat and pressure.

14. A shaping material composed of a plastic material according to claim 13 and a chemical plasticizer.

15. A shaping material according to claim 14 in which the plasticizer is triglycol or polyethylene 200.

* * * * *